US012752789B2

(12) United States Patent
Wassef et al.

(10) Patent No.: US 12,752,789 B2
(45) Date of Patent: Oct. 6, 2026

(54) VOICE ACTIVATED LANE CHANGE WITH DRIVER MONITORING SYSTEM VALIDATATION

(71) Applicant: GM GLOBAL TECHNOLOGY OPERATIONS LLC, Detroit, MI (US)

(72) Inventors: Andrew Wassef, Novi, MI (US); Namal P. Kumara, Ypsilanti, MI (US); Paul A. Adam, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 18/928,858

(22) Filed: Oct. 28, 2024

(65) Prior Publication Data

US 2026/0116387 A1 Apr. 30, 2026

(51) Int. Cl.

*B60W 30/18* (2012.01)
*B60K 35/28* (2024.01)
*B60W 50/14* (2020.01)
*G06F 3/16* (2006.01)
*G06V 20/59* (2022.01)
*G06V 40/10* (2022.01)

(52) U.S. Cl.

CPC ....... *B60W 30/18163* (2013.01); *B60K 35/28* (2024.01); *B60W 50/14* (2013.01); *G06F 3/167* (2013.01); *G06V 20/59* (2022.01); *G06V 40/10* (2022.01); *B60K 2360/1868* (2024.01); *B60K 2360/188* (2024.01); *B60W 2050/146* (2013.01); *B60W 2420/403* (2013.01); *B60W 2420/54* (2013.01); *B60W 2540/21* (2020.02); *B60W 2540/225* (2020.02); *B60W 2556/50* (2020.02)

(58) Field of Classification Search

CPC ............................................... B60W 30/18163

See application file for complete search history.

(56) References Cited

U.S. PATENT DOCUMENTS 11,562,550 B1 * 1/2023 Asghar .................. G06F 3/012
12,115,964 B1 * 10/2024 Hawley .......... B60W 30/18163

(Continued)

FOREIGN PATENT DOCUMENTS

JP 201532966 A * 7/2015
WO WO-2015107732 A1 * 7/2015 ............ G08G 1/167
WO WO-2024261088 A1 * 12/2024 ........... B60W 40/08

OTHER PUBLICATIONS

Machine translation of JP201532966A (Year: 2015).*

*Primary Examiner* — Long T Tran

(74) *Attorney, Agent, or Firm* — Ingrassia Fisher & Lorenz, LLP | IFL

(57) ABSTRACT

In exemplary embodiments, methods and systems are provided that include one or more microphones of a vehicle that are configured to obtain a voice input from a user of the vehicle with a request for the vehicle to make a lane change maneuver; one or more additional sensors of the vehicle, the one or more additional sensors configured to obtain additional sensor data pertaining to the user; and a processor that is coupled to the one or more microphones and that is configured to at least facilitate verifying the request using the additional sensor data; and automatically controlling the lane change maneuver based on the request, via instructions provided by the processor, based on both the voice input and the verification.

20 Claims, 3 Drawing Sheets

(56) References Cited

U.S. PATENT DOCUMENTS

| | | | | |
|---|---|---|---|---|
| 2007/0290823 | A1* | 12/2007 | Watanabe | B60Q 1/2665 348/148 |
| 2017/0043720 | A1* | 2/2017 | Shaw | B60R 1/28 |
| 2017/0334348 | A1* | 11/2017 | Trinh | G06V 40/18 |
| 2018/0170375 | A1* | 6/2018 | Jang | B60W 30/0956 |
| 2019/0351918 | A1* | 11/2019 | Maeng | H04W 4/023 |
| 2021/0064030 | A1* | 3/2021 | Jiang | G08G 1/096844 |
| 2023/0106673 | A1* | 4/2023 | Asghar | G06V 20/584 382/104 |
| 2024/0300509 | A1* | 9/2024 | Musabini | B60W 60/001 |

* cited by examiner

VOICE ACTIVATED LANE CHANGE WITH DRIVER MONITORING SYSTEM VALIDATATION

INTRODUCTION

The technical field generally relates to vehicles and, more specifically, to methods and systems for controlling driver-requested lane change maneuvers for autonomous or semi-autonomous vehicles.

Certain vehicles today include autonomous or semi-autonomous functionality in which the vehicle automatically controls certain vehicle maneuvers, such as lane change maneuvers. However, such existing vehicle systems may not always provide optimal control of certain vehicle maneuvers, including in interpreting and executing driver requests for lane change maneuvers.

Accordingly, it is desirable to provide improved methods and systems for controlling vehicle maneuvers, including driver-requested lane change maneuvers for vehicles. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes obtaining, via one or more microphones of a vehicle, a voice input from a user of the vehicle with a request for the vehicle to make a lane change maneuver; verifying, via a processor of the vehicle, the request using additional sensor data pertaining to the user that is obtained from one or more additional sensors of the vehicle; and automatically controlling the lane change maneuver based on the request, via instructions provided by the processor, based on both the voice input and the verification.

Also in an exemplary embodiment, the method further includes obtaining camera images as to the user from one or more cameras of the vehicle; wherein the step of verifying the request includes verifying, via the processor using the camera images, whether the user is looking in a direction of the lane change maneuver; and wherein the step of automatically controlling the lane change maneuver includes automatically controlling the lane change maneuver pursuant to the request, based on whether the user is looking in the direction of the lane change maneuver.

Also in an exemplary embodiment, the step of automatically controlling the lane change maneuver includes at least facilitating performing the lane change maneuver pursuant to the request, if and only if it is determined by the processor based on the camera images that the user is looking in the direction of the lane change maneuver.

Also in an exemplary embodiment, the step of automatically controlling the lane change maneuver includes autonomously performing the lane change maneuver pursuant to the request without physical interaction by the user, if and only if it is determined by the processor based on the camera images that the user is looking in the direction of the lane change maneuver.

Also in an exemplary embodiment, the user includes a driver of the vehicle; the step of verifying the request includes verifying, via the processor using the camera images, whether a gaze of eyes of the driver is directed toward a side view mirror that is in the direction of the lane change maneuver; and the step of automatically controlling the lane change maneuver includes at least facilitating performing the lane change maneuver pursuant to the request, if and only if it is determined by the processor based on the camera images that the gaze of the eyes of the driver is directed toward the side view mirror that is in the direction of the lane change maneuver.

Also in an exemplary embodiment, the method further includes initiating a timer, via the processor, when the voice input is received; wherein the step of verifying the request includes verifying, via the processor using the camera images, whether the gaze of eyes of the driver is directed toward the side view mirror that is in the direction of the lane change maneuver within a first predetermined amount of time before the timer has elapsed, and further provided that the gaze is directed toward the side view mirror for at least a second predetermined amount of time; and the step of automatically controlling the lane change maneuver includes at least facilitating performing the lane change maneuver pursuant to the request, if and only if it is determined by the processor based on the camera images that the gaze of the eyes of the driver is directed toward the side view mirror within the first predetermined amount of time before the timer has elapsed, and further provided that the gaze is directed toward the side view mirror for at least the second predetermined amount of time.

Also in an exemplary embodiment, the first predetermined amount of time is two seconds; and the second predetermined amount of time is one fourth of one second.

Also in an exemplary embodiment, the method further includes providing a color-coded visual notification of the timer for the driver of the vehicle, on a display screen of the vehicle in accordance with instructions provided by the processor.

Also in an exemplary embodiment, the method further includes obtaining, via a satellite-based location system, a geographic location of the vehicle; and determining, via the processor, a meaning of the request based on a language associated with the geographic location and that is retrieved from a computer memory; wherein the verifying of the request is based also on the meaning; and wherein the step of automatically controlling the lane change maneuver includes automatically controlling the lane change maneuver, via instructions provided by the processor, based on both the meaning and the verification.

In another exemplary embodiment, a system is provided that includes one or more microphones of a vehicle that are configured to obtain a voice input from a user of the vehicle with a request for the vehicle to make a lane change maneuver; one or more additional sensors of the vehicle, the one or more additional sensors configured to obtain additional sensor data pertaining to the user; and a processor that is coupled to the one or more microphones and that is configured to at least facilitate verifying the request using the additional sensor data; and automatically controlling the lane change maneuver based on the request, via instructions provided by the processor, based on both the voice input and the verification.

Also in an exemplary embodiment, the one or more additional sensors include one or more cameras of the vehicle that are configured to obtain camera images as to the user; and the processor is further configured to at least facilitate verifying, using the camera images, whether the user is looking in a direction of the lane change maneuver; and automatically controlling the lane change maneuver pursuant to the request, based on whether the user is looking in the direction of the lane change maneuver.

Also in an exemplary embodiment, the processor is further configured to at least facilitate performing the lane change maneuver pursuant to the request, if and only if it is determined by the processor based on the camera images that the user is looking in the direction of the lane change maneuver.

Also in an exemplary embodiment, the processor is further configured to provide instructions to autonomously perform the lane change maneuver pursuant to the request without physical interaction by the user, if and only if it is determined by the processor based on the camera images that the user is looking in the direction of the lane change maneuver.

Also in an exemplary embodiment, the user includes a driver of the vehicle; and the processor is further configured to at least facilitate verifying, using the camera images, whether a gaze of eyes of the driver is directed toward a side view mirror that is in the direction of the lane change maneuver; and performing the lane change maneuver pursuant to the request, if and only if it is determined by the processor based on the camera images that the gaze of the eyes of the driver is directed toward the side view mirror that is in the direction of the lane change maneuver.

Also in an exemplary embodiment, the processor is further configured to at least facilitate initiating a timer, via the processor, when the voice input is received; verifying, using the camera images, whether the gaze of eyes of the driver is directed toward the side view mirror that is in the direction of the lane change maneuver within a first predetermined amount of time before the timer has elapsed, and further provided that the gaze is directed toward the side view mirror for at least a second predetermined amount of time; and performing the lane change maneuver pursuant to the request, if and only if it is determined by the processor based on the camera images that the gaze of the eyes of the driver is directed toward the side view mirror within the first predetermined amount of time before the timer has elapsed, and further provided that the gaze is directed toward the side view mirror for at least the second predetermined amount of time.

Also in an exemplary embodiment, the first predetermined amount of time is two seconds; and the second predetermined amount of time is one fourth of one second.

Also in an exemplary embodiment, the processor is further configured to at least facilitate providing a color-coded visual notification of the timer for the driver of the vehicle, on a display screen of the vehicle in accordance with instructions provided by the processor.

Also in an exemplary embodiment, the processor if further configured to at least facilitate obtaining, from a satellite-based location system, a geographic location of the vehicle; determining a meaning of the request based on a language that is associated with the geographic location and that is retrieved from a computer memory; verifying the request is based also on the meaning; and automatically controlling the lane change maneuver, via instructions provided by the processor, based on both the meaning and the verification.

In another exemplary embodiment, a vehicle is provided that includes a body; a side view mirror; a drive system configured to move the body; a braking system; a steering system; one or more microphones that are configured to obtain a voice input from a driver of the vehicle with a request for the vehicle to make a lane change maneuver; one or more cameras of the vehicle that are configured to obtain camera images of the driver of the vehicle; and a processor that is coupled to the one or more microphones, the one or more cameras, the drive system, the braking system, and the steering system, the processor configured to at least facilitate initiating a timer when the voice input is received; verifying the request by verifying, using the camera images, whether a gaze of eyes of the driver is directed toward the side view mirror in a direction toward the lane change maneuver within a first predetermined amount of time including approximately two seconds before the timer has elapsed, and further provided that the gaze is directed toward the side view mirror for at least a second predetermined amount of time including approximately one quarter of one second; and performing the lane change maneuver pursuant to the request, if and only if it is determined by the processor based on the camera images that the gaze of eyes of the driver is directed toward the side view mirror in the direction toward the lane change maneuver within the first predetermined amount of time of approximately two seconds before the timer has elapsed, and further provided that the gaze is directed toward the side view mirror for at least the second predetermined amount of time of approximately one quarter of one second.

Also in an exemplary embodiment, the processor is further configured to at least facilitate providing a blue color-coded visual notification of the timer for the driver of the vehicle, on a display screen of the vehicle in accordance with instructions provided by the processor; obtaining, from a satellite-based location system, a geographic location of the vehicle; determining a meaning of the request based on a language that is associated with the geographic location and that is retrieved from a computer memory; verifying the request is based also on the meaning; and automatically controlling the lane change maneuver, via instructions provided by the processor, based on both the meaning and the verification.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
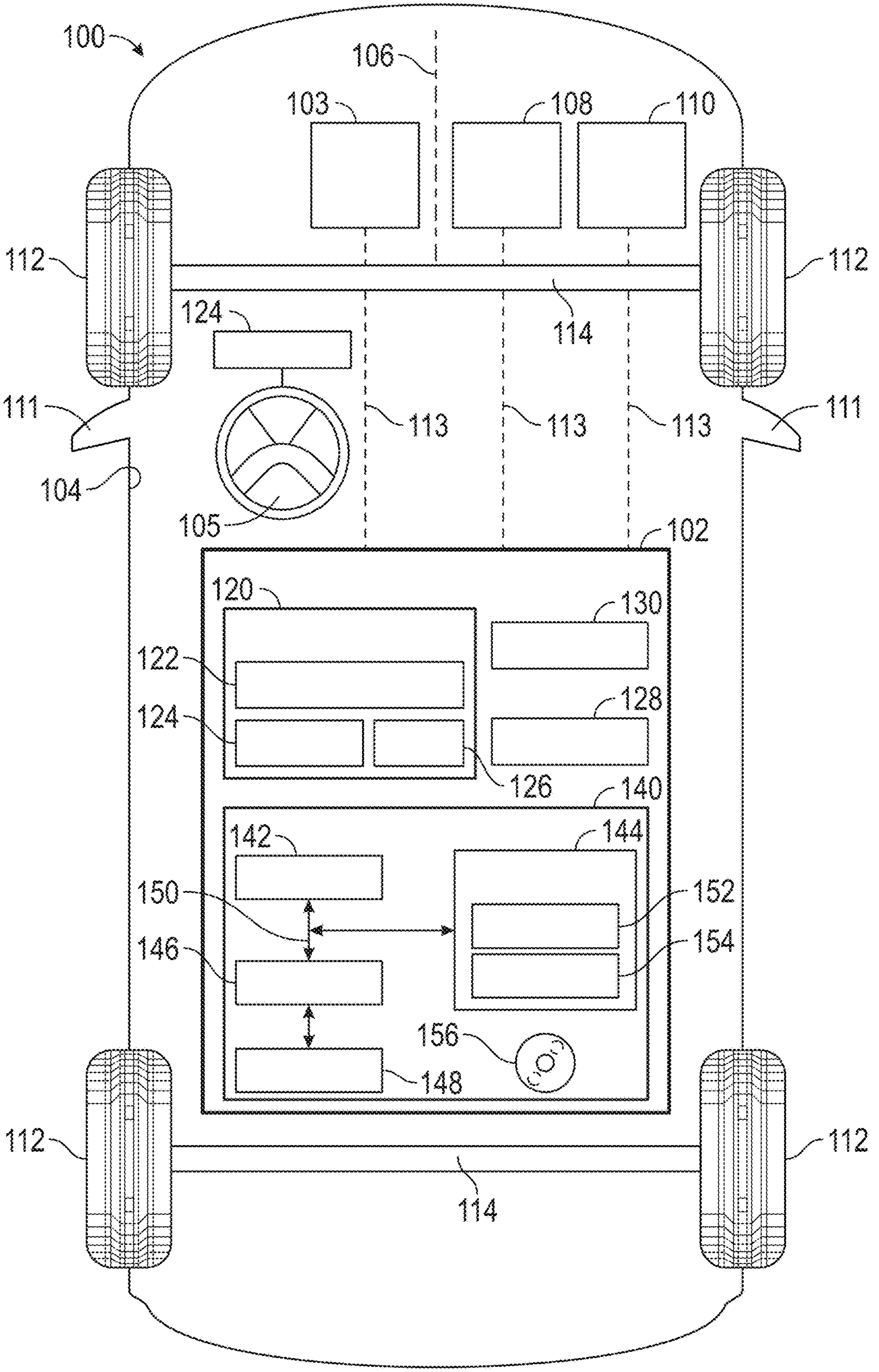
FIG. 1 is a functional block diagram of a vehicle that includes a control system for controlling driver-requested lane change maneuvers for the vehicle, in accordance with exemplary embodiments.

FIG. 1 illustrates a vehicle 100, according to an exemplary embodiment. As described in greater detail further below, the vehicle 100 includes a control system 102 that is configured for controlling driver-requested lane change maneuvers for the vehicle, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 112. The wheels 112 are each rotationally coupled to the chassis 106 near a respective corner of the body 104 to facilitate movement of the vehicle 100. In one embodiment, the vehicle 100 includes four wheels 112, although this may vary in other embodiments (for example for trucks and certain other vehicles).

In exemplary embodiments, the vehicle 100 includes a steering system 103 that controls steering of the vehicle 100. In various embodiments, the steering system 103 controls steering of the vehicle 100 via steering components, for example that including a steering column that is coupled to the axles 114 and/or the wheels 112, and that is controlled via inputs provided in certain instances by a driver via a steering wheel 105, and in certain other instances automatically via the control system 102.

As depicted in FIG. 1, in various embodiments the vehicle 100 also includes a plurality of side view mirrors 111 for use by a driver of the vehicle 100, including for use in requesting a lane change maneuver for the vehicle 100 (and further for use in making or requesting vehicle 100 turns, and so on).

Also in exemplary embodiments, a drive system 110 is mounted on the chassis 106, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. Also in exemplary embodiments, the drive system 110 controls propulsion of the vehicle 100 in accordance with via inputs provided by a driver (e.g., via an accelerator pedal) and/or automatically via the control system 102.

As depicted in FIG. 1, the vehicle also includes a braking system 108 in various embodiments. In exemplary embodiments, the braking system 108 controls braking of the vehicle 100 using braking components that are controlled via inputs provided by a driver (e.g., via a braking pedal in certain embodiments) and/or automatically via the control system 102.

In certain embodiments, the vehicle 100 comprises a semi-autonomous vehicle in which vehicle movement and operation (including steering via the steering system 103, propulsion via the drive system 110, and braking via the braking system 108) are controlled in certain situations via the driver, and in certain other situations autonomously by the control system 102. In certain other embodiments, the vehicle 100 may comprise a fully autonomous vehicle in which vehicle movement and operation (including steering via the steering system 103, propulsion via the drive system 110, and braking via the braking system 108) is controlled autonomously by the control system 102 (in certain embodiments further in consideration of requests, such as voice requests, made by a user of the vehicle 100).

In the embodiment depicted in FIG. 1, the control system 102 is coupled to the steering system 103, the braking system 108, and the propulsion system 110. In certain embodiments, the control system 102 may also be coupled to one or more other vehicle systems and/or components, including via one or more communications networks 113 (e.g., a vehicle CAN bus, in certain embodiments). In various embodiments, the control system 102 controls driver-requested lane change maneuvers for the vehicle 100, including by automatically implementing and/or assisting with driver-requested lane change maneuvers that are requested by voice commands of the driver after the control system 102 has first verified that the driver is in fact looking in the direction of the requested lane change maneuver (i.e., by gazing at the appropriate side view mirror 111). In various embodiments, the control system 102 provides these functions in accordance with the process 300 of FIG. 3, and as described in greater detail further below in connection therewith. In certain embodiments, the control system 102 may also control one or more other systems of the vehicle 100.

As depicted in FIG. 1, in various embodiments, the control system 102 includes a sensor array 120, a location system 128, a display 130, and a controller 140, as described in greater detail below.

In various embodiments, the sensor array 120 includes various sensors that detect when a driver is requesting a lane change maneuver, and that further confirm that the driver is looking in the direction of the requested lane change maneuver before the requested lane change maneuver is automatically executed or facilitated by the control system 102, in accordance with an exemplary embodiment. In the depicted embodiment, the sensor array 120 includes one or more microphones 122 and cameras 124. In certain embodiments, the sensor array 120 may also include one or more other sensors 126.

In an exemplary embodiments, the one or more microphones 122 obtain audio sensor data that include a request from a driver (or other user) of the vehicle 100 to make a lane change maneuver, such as lane change from a current lane of the vehicle 100 to an adjacent lane. In various embodiments, the microphones 122 may also obtain other verbal requests from the driver or other user.

In various embodiments, the one or more cameras 124 obtain camera sensor data that comprise camera images pertaining to a face of a driver of other user of the vehicle 100. In certain embodiments, the cameras 124 specifically obtain camera images as to eyes of the driver, including a direction of gaze of the driver's eyes. In certain embodiments, the one or more cameras 124 are placed on or near the steering wheel 105 as part of a driver monitoring system (DMS); however, this may vary in other embodiments.

In addition, in certain embodiments, the sensor array 120 may also include one or more other sensors 126, such as one or more transmission sensors (e.g., for determining when the vehicle 100 is turned on activated for a current vehicle drive, and so on) and/or more detection sensors (e.g., one or more radar, Lidar, and/or other detection sensors to facilitate operation of the vehicle 100, including for lane change maneuvers), and/or other types of other sensors 126 in various embodiments.

In various embodiments, the location system 128 determines a geographic location of the vehicle 100. In various embodiments, the location system 128 comprises a satellite-based location system that is used in accordance with a navigation system for the vehicle 100, such as a global positioning system (GPS) in an exemplary embodiment.

In various embodiments, the display 130 provides information for a driver and/or other user of the vehicle 100. For example, in various embodiments, the display 130 provides a digital cluster of display images that feature parameters and information pertaining to operation of the vehicle 100. In certain embodiments, as described in greater detail further below in connection with the process 300 of FIG. 3, the display 130 provides information that, once the driver has requested a lane change maneuver via a voice command, a timer has been initiated for the driver to look in the direction of the requested lane change maneuver before the lane change maneuver is implemented by the control system 102. In certain embodiments, this information may be provided in the form of illumination of a display screen or other display component in a particular component in a particular color (e.g., blue, in one embodiment) indicating that a driver action or confirmation is required. In certain embodiments, a similar notification may be provided in other manners, for example via one or more audio and/or haptic notifications (e.g., via an audio message provided via a speaker of the vehicle and/or a haptic vibration via vibration of the driver seat, among other possible implementations).

In various embodiments, the controller 140 is coupled to the sensor array 120 and to the location system 128 and display 130, as well as to the steering system 103, the drive system 110, and the braking system 108. In various embodiments, the controller 140 may also be coupled to one or more other vehicle systems, as noted above. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) receives and verifies user requests (including for lane change maneuvers) via the sensor array 120, interprets the meaning of the user requests (including in certain embodiments based on the location of the vehicle 100 as determined using the location system 128), provides information (including as to the verification) via the display 130, and automatically controls the driver-requested lane change maneuver via control of the steering system 103, drive system 110, and braking system 108. In various embodiments, the controller 140 provides these and other functions in accordance with the steps of the process 300 of FIG. 3.

In various embodiments, the controller 140 (and, in certain embodiments, the control system 102 itself) is disposed within the body 104 of the vehicle 100. In one embodiment, the control system 102 is mounted on the chassis 106. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 300 of FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with stored values 157 (e.g., threshold values for the process 300 of FIG. 3 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 300 discussed further below in connection with FIG. 3. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
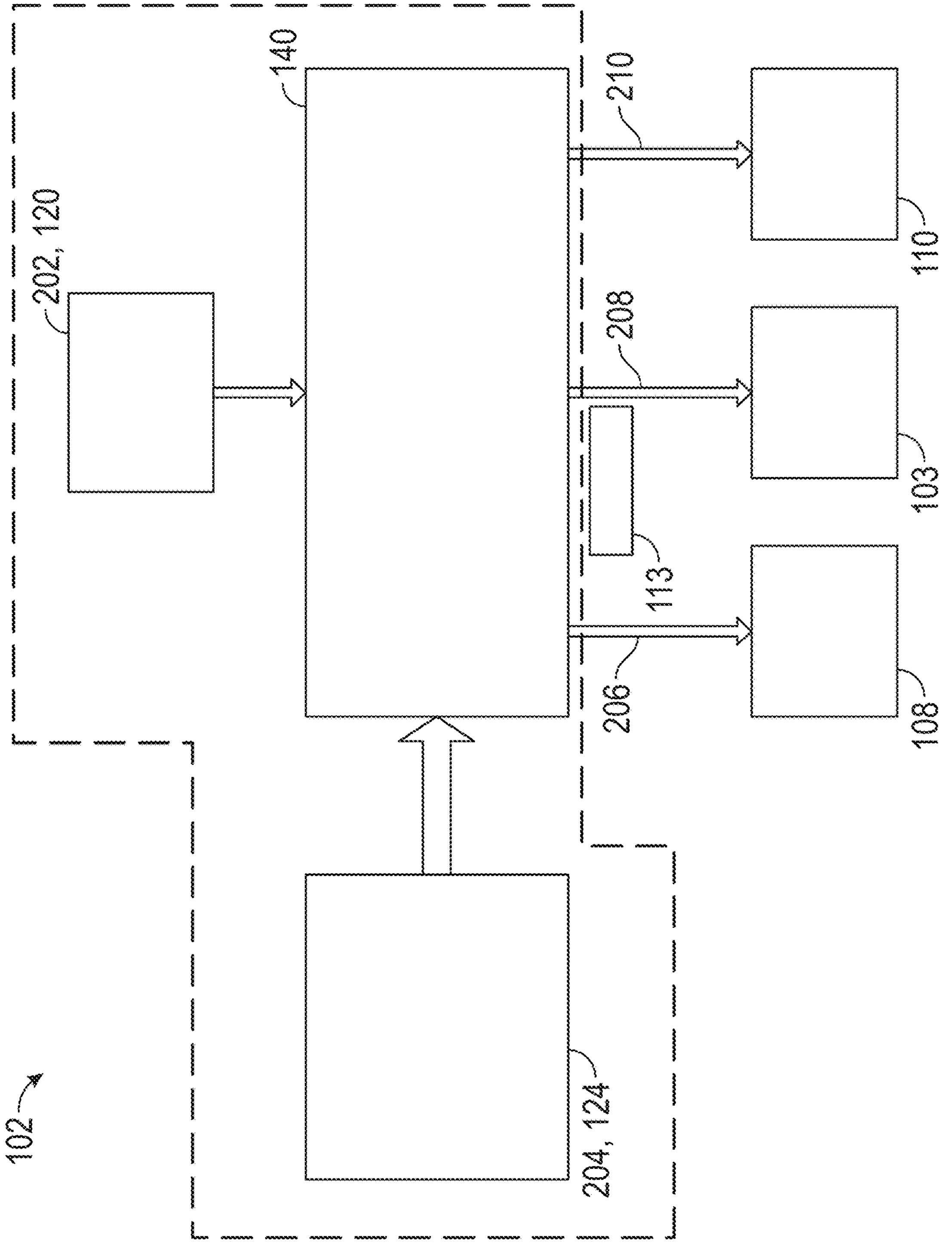
FIG. 2 is a functional block diagram of an implementation of an architecture for the control system of FIG. 1, in accordance with exemplary embodiments.

FIG. 2 is a functional block diagram of an implementation of an architecture for the control system 102 of FIG. 1, in accordance with exemplary embodiments. As depicted in FIG. 2, in various embodiments the architecture of the control system 102 includes the controller 140 of FIG. 1, along with a driver monitoring system (DMS) 204 and a voice command unit (VCU) 202.

As depicted in FIG. 2, in various embodiments, the VCU 202 includes and/or is coupled to one or more microphones 122 of FIG. 1, and receives and interprets requests from the driver or other user of the vehicle 100. Also as depicted in FIG. 2, in various embodiments, the DMS 204 includes and/or is coupled to one or more cameras 124 of FIG. 1, and monitors position and movement of the driver (including a direction of gaze of the eyes of the driver).

Also as depicted in FIG. 2, in various embodiments, the controller 140 receives sensor data from both the VCU 202 (including voice commands from the driver for a driver-requested lane change maneuver) and the DMS 204 (including confirmation that the driver is looking in the direction of the driver-requested lane change maneuver). In various embodiments, the controller 140 processes the sensor data and implements the driver-requested lane change maneuver (when verified by the controller 140 based on the direction of the gaze of the eyes of the driver) in providing instructions via the communications network 113 of the vehicle (e.g., a vehicle CAN connection and/or link, in certain embodiments) to the steering system 103, drive system 110, and braking system 108, which then implement the instructions from the controller 140 (i.e., from the processor 142 thereof in certain embodiments).

Figure 3:
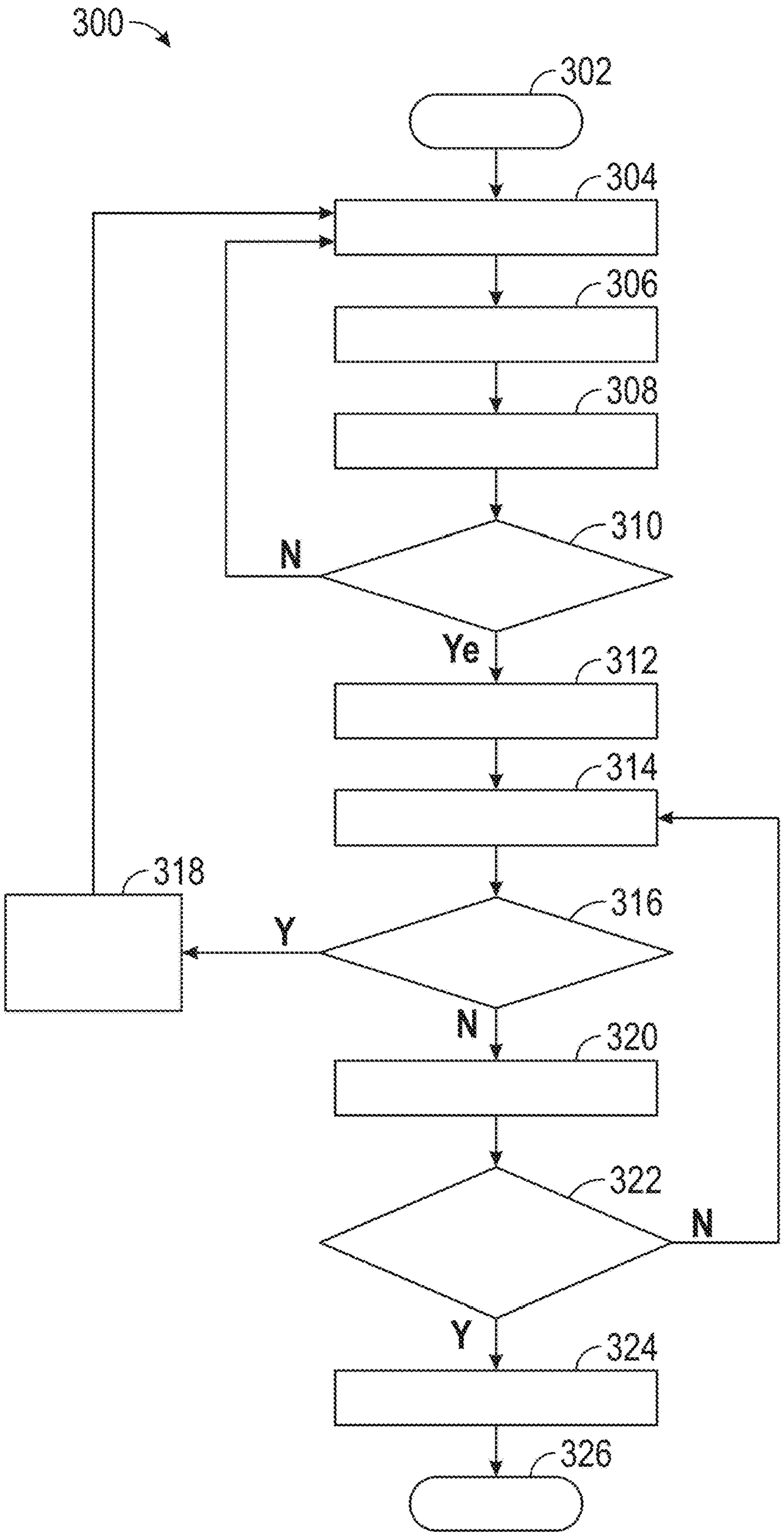
FIG. 3 is a flowchart of a process for controlling driver-requested lane change maneuvers for a vehicle, and that can be implemented in connection with the vehicle of FIG. 1, including the control system of FIGS. 1 and 2., in accordance with exemplary embodiments.

FIG. 3 is a flowchart of a process 300 for controlling a driver-requested lane change maneuver for a vehicle, in accordance with an exemplary embodiment. In various embodiments, the vehicle comprises a fully autonomous or semi-autonomous vehicle. Also in various embodiments, the process 300 can be implemented in connection with the vehicle 100 of FIG. 1, including the control system 102 of FIGS. 1 and 2, and components thereof.

As depicted in FIG. 3, in various embodiments, the process 300 begins at step 302. In one embodiment, the process 300 begins when a vehicle drive or ignition cycle begins, for example when a driver enters the vehicle for operation of the vehicle (e.g., as detected one or more of the other sensors 126 of the sensor array 120 of FIG. 1 in certain embodiments). In one embodiment, the steps of the process 300 are performed continuously during operation of the vehicle.

In various embodiments, voice inputs are received (step 304). In various embodiments, the voice inputs (also referred to herein as audio sensor data) are obtained from a driver or other user of the vehicle 100 via one or more microphones 122 of FIG. 1.

Also in various embodiments, location data is obtained (step 306). In various embodiments, during step 306, location data is obtained from the location system 128 of FIG. 1 (e.g., from a GPS system in certain embodiments), and pertains to a current geographic location of the vehicle 100.

Also in various embodiments, a meaning of the voice commands is ascertained (step 308). In various embodiments, the processor 142 determines a meaning of the voice inputs of step 304, along with the location of step 306. Specifically, in various embodiments, the processor 142 determines the meaning of the voice inputs also based on stored values 154 of the memory 144 of FIG. 1, including as to an applicable language, in addition to jargon, slang, and the like, that is customary for users in the particular location in which the vehicle 100 is now operating.

In various embodiments, a determination is made as to the whether the driver has requested a lane change maneuver (step 310). Specifically, in various embodiments, the processor 142 determines that whether the driver (or other user) has requested a lane change maneuver based on the voice inputs of step 304, and specifically based on the meaning determined in step 308.

In various embodiments, if it is determined in step 310 that the driver has not requested a lane change, then in various embodiments the process 300 returns to step 304. In various embodiments, the process 300 then proceeds in a new iteration of step 304, in which new voice inputs are received.

Conversely, if it is instead determined in step 310 that the driver has requested a lane change, then in various embodiments a timer is initiated (step 312). In various embodiments, during step 312, the processor 142 initiates a timer that lasts for a predetermined amount of time, and in which the driver is expected to gaze in the direction of the requested turn in order for the requested turn to be automatically executed in accordance with instructions provided by the processor 142.

Also in various embodiments, a display is provided (step 314). Specifically, and similar to the discussion above with respect to the display 130 of FIG. 1, in various embodiments information is provided by the display 130 (e.g., on a display screen thereof), in accordance with instructions provided by the process, that the timer has been initiated for the driver to look in the direction of the requested lane change maneuver before the lane change maneuver is implemented by the control system 102. In certain embodiments, this display and the associated information are provided in the form of illumination of a display screen or other display component in a particular component in a particular color (e.g., blue, in one embodiment) indicating that a driver action or confirmation is required. In certain embodiments, a similar notification may be provided in other manners, for example via one or more audio and/or haptic notifications (e.g., via an audio message provided via a speaker of the vehicle and/or a haptic vibration via vibration of the driver seat, among other possible implementations).

In various embodiments, a determination is made as to whether the timer has expired (step 316). Specifically, in various embodiments, the processor 142 determines whether the timer of step 312 has expired by comparing (a) an amount of time that has elapsed since the timer was initiated versus (b) a predetermined threshold ($T_1$). In various embodiments, this determination is made continuously throughout the process 300 once the timer has been initiated, and so long as the timer remains active. Also in various embodiments, the predetermined threshold ($T_1$) is stored in the memory 144 of FIG. 1 as a stored value 154 thereof. In one exemplary embodiment, the predetermined threshold ($T_1$) of step 316 is equal to two seconds (or approximately thereto in certain embodiments); however, this may vary in other embodiments.

In various embodiments, if it is determined in step 316 that the timer has expired (i.e., without the driver looking in the direction of the requested turn, as described below), then in various embodiments the timer has elapsed and is terminated (step 318). In various embodiments, this is performed by the processor 142 of FIG. 1. Also in various embodiments, the process 300 then returns to step 304, and the process 300 thereafter repeats in a new iteration.

Conversely, in various embodiments, when the timer has not yet expired, driver monitoring sensor data is obtained (step 320). In various embodiments, camera images are obtained with respect to one or more cameras 124 of FIG. 1 as to the driver, and in particular with respect to the head and eyes of the driver and a direction of the gaze of the eyes of the driver. In various embodiments, the driver monitoring sensor data (including the camera images) is obtained made continuously throughout the process 300 once the timer has been initiated, and so long as the timer remains active. Accordingly, in various embodiments, steps 316 and 320 (and also in various embodiments step 314 as described above and step 322 described below) can be performed simultaneously to one another and in combination with one another as long as the timer remains active (i.e., until the timer has elapsed).

In various embodiments, a determination is made as to whether the driver is looking in the direction of the requested lane change (step 322). Specifically, in various embodiments, the processor 142 determines, using the driver monitoring sensor data of step 320 (i.e., using the camera images of the driver, whether the driver is looking in the direction of the requested turn (e.g., whether the driver is looking at the lane into which the driver has requested the vehicle 100 to turn). Also in exemplary embodiments, the driver is deemed to be looking in the direction of the requested lane change when a gaze of the eyes of the driver is facing toward the direction of the requested lane change. More specifically, in an embodiment, the driver is deemed to be looking in direction of the requested lane change when a gaze of the eyes of the driver is facing toward particular one of the side view mirrors 111 that is in the direction of the requested lane change.

Also in certain embodiments, in order for the driver to be determined to be looking in the direction of the requested lane change maneuver, the driver must be looking in the direction of the requested lane change maneuver for at least a predetermine amount of time corresponding to a second time threshold $T_2$. In certain embodiments, the second time threshold $T_2$ is stored in the memory 144 of FIG. 1 as a stored value 154 thereof. In one embodiment, the second time threshold $T_2$ is equal to one quarter of one second (i.e., 0.25 seconds) (or approximately thereto); however, this may vary in other embodiments.

In various embodiments, if it is determined in step 322 that the driver is not looking in the direction of the requested lane change, then the process returns to step 314. In various embodiments, the process 300 then continues in a new iteration beginning with step 314, as the display continues to be provided in step 314, the driver monitoring data continues to be collected in step 320, the determinations of steps 316 and 322 continue to be made by the processor 142, and so on, so long as the timer remains active (i.e., as determined in step 316, as described above).

Conversely, in various embodiments, if it is instead determined in step 322 that the driver is looking in the direction of the requested lane change (i.e., toward the side view mirror 111 in the direction of the requested lane change in an exemplary embodiment), then the lane change is automatically executed (step 324). In various embodiments, during step 324, the processor 142 of FIG. 1 provides instructions to the steering system 103, drive system 110, and braking system 108 of FIG. 1 to automatically perform the driver-requested lane change, which are implemented by the steering system 103, drive system 110, and braking system 108. In certain embodiments, the requested lane change maneuver is automatically completely performed in this matter by the vehicle 100 in accordance with the instructions provided by the processor 142, without any physical action of the driver. In certain other embodiments, during step 324 the processor 142 may instead provide steering assistance, through the instructions that are provided to and implemented by steering system 103, drive system 110, and braking system 108, in order to provide steering assistance to facilitate the requested lane change maneuver in combination with some physical actions provided by the driver.

In various embodiments, the process 300 then terminates at 326.

Accordingly, methods, systems, and vehicles are provided for controlling driver-requested lane change maneuvers for autonomous and semi-autonomous vehicles. In various embodiments, after the system receives a voice command from a driver for a requested lane change maneuver, the system verifies that the driver is actually looking at the direction of the proposed lane change (i.e., by looking at the applicable side view mirror) before automatically executing the lane change maneuver.

In certain embodiments, the disclosed methods, systems, and vehicles thereby help to ensure that the driver actually intends to make the lane change before automatically performing the lane change. For example, the disclosed methods, systems, and vehicles would help to ensure that a lane change is not made merely based on a discussion of different passengers amongst themselves about the possibility of a lane change, or merely based on some other inadvertent detected audio input that might otherwise be inadvertently construed as a lane change request. Also in certain embodiments, the methods, systems, and vehicles also help to facilitate the requested lane change in a number of other circumstances that might otherwise be difficult for the driver, such as when driver may need assistance with making the lane change due to a physical disability, among various other implementations of the methods, systems, and vehicles described herein.

It will be appreciated that the systems, vehicles, and methods may vary from those depicted in the Figures and described herein. For example, the vehicle 100 of FIG. 1, the control system 102 of FIGS. 1 and 2, and/or components thereof may vary in different embodiments. It will similarly be appreciated that the steps of the process 300 may differ from that depicted in FIG. 3, and/or that various steps of the process 300 may occur concurrently and/or in a different order than that depicted in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining, via one or more microphones of a vehicle, a voice input from a user of the vehicle with an initial voice request for the vehicle to make a lane change maneuver; and subsequent to the obtaining of the initial voice request from the voice input, providing a redundant visual confirmation of the initial voice request by:

obtaining camera images as to the user from one or more cameras of the vehicle;

determining, via a processor of the vehicle, a direction in which the user is looking, based on the camera images;

providing a redundant visual verification of the initial voice request, via the processor of the vehicle, based on whether the direction in which the user is looking corresponds to a direction of the lane change maneuver pursuant to the initial voice request, as determined by the processor based on the camera images in a sequence in which the obtaining of the camera images, the determining of the direction in which the user is looking, and providing of the redundant visual verification are each performed subsequent to, and as the redundant visual confirmation of, the initial voice request; and automatically controlling the lane change maneuver based on the initial voice request, via instructions provided by the processor, based on both the voice input and the subsequent redundant visual verification in accordance with the sequence in which the obtaining of the camera images, the determining of the direction in which the user is looking, and the providing of the redundant visual verification are each performed subsequent to, and as the redundant visual confirmation of, the initial voice request.

2. The method of claim 1, wherein the step of automatically controlling the lane change maneuver comprises at least facilitating performing the lane change maneuver pursuant to the request, if and only if it is determined by the processor based on the camera images that the user is looking in the direction of the lane change maneuver pursuant to the sequence in which the obtaining of the camera images, the determining of the direction in which the user is looking, and providing of the redundant visual verification are each performed subsequent to, and as the redundant visual confirmation of, the initial voice request.

3. The method of claim 2, wherein the step of automatically controlling the lane change maneuver comprises autonomously performing the lane change maneuver pursuant to the request without physical interaction by the user, if and only if it is determined by the processor based on the camera images that the user is looking in the direction of the lane change maneuver.

4. The method of claim 2, wherein:

the user comprises a driver of the vehicle;

the step of verifying the request comprises verifying, via the processor using the camera images, whether a gaze of eyes of the driver is directed toward a side view mirror that is in the direction of the lane change maneuver; and the step of automatically controlling the lane change maneuver comprises at least facilitating performing the lane change maneuver pursuant to the request, if and only if it is determined by the processor based on the camera images that the gaze of the eyes of the driver is directed toward the side view mirror that is in the direction of the lane change maneuver.

5. The method of claim 4, further comprising:

initiating a timer, via the processor, when the initial voice request is received via the voice input;

wherein:

the step of verifying the request comprises verifying, via the processor using the camera images, whether the gaze of eyes of the driver is directed toward the side view mirror that is in the direction of the lane change maneuver within a first predetermined amount of time before the timer has elapsed following the receiving of the initial voice request, and further provided that the gaze is directed toward the side view mirror for at least a second predetermined amount of time following the receiving of the initial voice request; and the step of automatically controlling the lane change maneuver comprises at least facilitating performing the lane change maneuver pursuant to the request, if and only if it is determined by the processor based on the camera images that the gaze of the eyes of the driver is directed toward the side view mirror within the first predetermined amount of time before the timer has elapsed following the receiving of the initial voice request, and further provided that the gaze is directed toward the side view mirror for at least the second predetermined amount of time following the receiving of the voice input.

6. The method of claim 5, wherein:

the first predetermined amount of time is two seconds; and the second predetermined amount of time is one fourth of one second.

7. The method of claim 5, further comprising:

providing a color-coded visual notification of the timer for the driver of the vehicle, on a display screen of the vehicle in accordance with instructions provided by the processor.

8. The method of claim 1, further comprising:

obtaining, via a satellite-based location system, a geographic location of the vehicle; and determining, via the processor, a meaning of the request based on a language associated with the geographic location and that is retrieved from a computer memory;

wherein the verifying of the request is based also on the meaning; and wherein the step of automatically controlling the lane change maneuver comprises automatically controlling the lane change maneuver, via instructions provided by the processor, based on both the meaning and the verification.

9. A system comprising:

one or more microphones of a vehicle that are configured to obtain a voice input from a user of the vehicle with an initial voice request for the vehicle to make a lane change maneuver;

one or more additional sensors of the vehicle, the one or more additional sensors configured to obtain additional sensor data pertaining to the user, the one or more additional sensors including one or more cameras configured to provide camera images as to the user of the vehicle subsequent to the obtaining of the initial voice request from the voice input and as part of a redundant visual confirmation of the initial voice request; and a processor that is coupled to the one or more microphones and that is configured to at least facilitate, subsequent to the obtaining of the initial voice request, and as part of the redundant visual confirmation of the initial voice request:

determining a direction in which the user is looking, based on the camera images;

providing a redundant visual confirmation of the initial voice request using the additional sensor data based on whether the direction in which the user is looking corresponds to a direction of the lane change maneuver pursuant to the initial voice request, as determined by the processor based on the camera images in a sequence in which the obtaining of the camera images, the determining of the direction in which the user is looking, and the providing of the redundant visual verification are each performed subsequent to, and as the redundant visual confirmation of, the initial voice request; and automatically controlling the lane change maneuver based on the initial voice request, via instructions provided by the processor, based on both the voice input and the subsequent redundant visual verification in accordance with the sequence in which the obtaining of the camera images, the determining of the direction in which the user is looking, and the providing of the redundant visual verification are each performed subsequent to, and as the redundant visual confirmation of, the initial voice request.

10. The system of claim 9, wherein the processor is further configured to at least facilitate:

performing the lane change maneuver pursuant to the request, if and only if it is determined by the processor based on the camera images that the user is looking in the direction of the lane change maneuver pursuant to the sequence in which the obtaining of the camera images, the determining of the direction in which the user is looking, and providing of the redundant visual verification are each performed subsequent to, and as the redundant visual confirmation of, the initial voice request.

11. The system of claim 10, wherein the processor is further configured to provide instructions to autonomously perform the lane change maneuver pursuant to the request without physical interaction by the user, if and only if it is determined by the processor based on the camera images that the user is looking in the direction of the lane change maneuver.

12. The system of claim 10, wherein:

the user comprises a driver of the vehicle; and the processor is further configured to at least facilitate:

verifying, using the camera images, whether a gaze of eyes of the driver is directed toward a side view mirror that is in the direction of the lane change maneuver; and performing the lane change maneuver pursuant to the request, if and only if it is determined by the processor based on the camera images that the gaze of the eyes of the driver is directed toward the side view mirror that is in the direction of the lane change maneuver.

13. The system of claim 12, wherein the processor is further configured to at least facilitate:

initiating a timer, via the processor, when the initial voice request is received via the voice input;

verifying, using the camera images, whether the gaze of eyes of the driver is directed toward the side view mirror that is in the direction of the lane change maneuver within a first predetermined amount of time before the timer has elapsed following the receiving of the initial voice request, and further provided that the gaze is directed toward the side view mirror for at least a second predetermined amount of time following the receiving of the initial voice request; and performing the lane change maneuver pursuant to the initial voice request, if and only if it is determined by the processor based on the camera images that the gaze of the eyes of the driver is directed toward the side view mirror within the first predetermined amount of time before the timer has elapsed following the receiving of the initial voice request, and further provided that the gaze is directed toward the side view mirror for at least the second predetermined amount of time following the receiving of the initial voice request.

14. The system of claim 13, wherein:

the first predetermined amount of time is two seconds; and the second predetermined amount of time is one fourth of one second.

15. The system of claim 13, wherein the processor is further configured to at least facilitate providing a color-coded visual notification of the timer for the driver of the vehicle, on a display screen of the vehicle in accordance with instructions provided by the processor.

16. The system of claim 9, wherein the processor if further configured to at least facilitate:

obtaining, from a satellite-based location system, a geographic location of the vehicle;

determining a meaning of the request based on a language that is associated with the geographic location and that is retrieved from a computer memory;

verifying the request is based also on the meaning; and automatically controlling the lane change maneuver, via instructions provided by the processor, based on both the meaning and the verification.

17. A vehicle comprising:

a body;

a side view mirror;

a drive system configured to move the body;

a braking system;

a steering system;

one or more microphones that are configured to obtain a voice input from a driver of the vehicle with an initial voice request for the vehicle to make a lane change maneuver;

one or more cameras of the vehicle that are configured to obtain camera images of the driver of the vehicle subsequent to the obtaining of the initial voice request from the voice input and as part of a redundant visual confirmation of the initial voice request; and a processor that is coupled to the one or more microphones, the one or more cameras, the drive system, the braking system, and the steering system, the processor configured to at least facilitate, subsequent to the obtaining of the initial voice request, and as part of the redundant visual confirmation of the initial voice request:

initiating a timer when the initial voice request is received via the voice input;

determining a direction in which the driver is looking, based on the camera images;

providing a redundant visual confirmation of the initial voice request by verifying, using the camera images, whether a gaze of eyes of the driver is directed toward the side view mirror in a direction toward the lane change maneuver pursuant to the initial voice request within a first predetermined amount of time comprising approximately two seconds before the timer has elapsed following the receiving of the initial voice request via the voice input, and further provided that the gaze is directed toward the side view mirror for at least a second predetermined amount of time comprising approximately one quarter of one second following the receiving of the initial voice request, as determined by the processor based on the camera images in a sequence in which the obtaining of the camera images, the determining of the direction in which the driver is looking, and providing of the redundant visual verification are each performed subsequent to, and as the redundant visual confirmation of, the initial voice request; and performing the lane change maneuver pursuant to the initial voice request, if and only if it is determined by the processor based on the camera images that the gaze of eyes of the driver is directed toward the side view mirror in the direction toward the lane change maneuver from the initial voice request, within the first predetermined amount of time of approximately two seconds before the timer has elapsed following the receiving of the initial voice request, and further provided that the gaze is directed toward the side view mirror for at least the second predetermined amount of time of approximately one quarter of one second following the receiving of the initial voice request, in accordance with the sequence in which the obtaining of the camera images, the determining of the direction in which the driver is looking, and the providing of the redundant visual verification are each performed subsequent to, and as the redundant visual confirmation of, the initial voice request.

18. The vehicle of claim 17, wherein the processor is further configured to at least facilitate:

providing a blue color-coded visual notification of the timer for the driver of the vehicle, on a display screen of the vehicle in accordance with instructions provided by the processor;

obtaining, from a satellite-based location system, a geographic location of the vehicle;

determining a meaning of the request based on a language that is associated with the geographic location and that is retrieved from a computer memory;

verifying the request is based also on the meaning; and automatically controlling the lane change maneuver, via instructions provided by the processor, based on both the meaning and the verification.

19. The method of claim 1, wherein the step of providing the color-coded visual notification includes a visual notification that the user has providing the initial voice request for a lane change maneuver and that verification is required by the driver of the initial voice request.

20. The method of claim 19, wherein the visual notification further provides instructions that the user is required to look at a side view mirror of the vehicle in the direction of the intended lane change maneuver in order for the vehicle to automatically initiate the lane change maneuver.

* * * * *